(12) United States Patent
Gomez et al.

(10) Patent No.: US 11,078,106 B2
(45) Date of Patent: Aug. 3, 2021

(54) TWO-STEP METHOD FOR STRENGTHENING GLASS

(71) Applicant: CORNING INCORPORATED, Corning, NY (US)

(72) Inventors: Sinue Gomez, Corning, NY (US); Lisa Ann Lamberson, Painted Post, NY (US); Robert Michael Morena, Lindley, NY (US)

(73) Assignee: Corning Incorporated, Corning, NY (US)

(*) Notice: Subject to any disclaimer, the term of this patent is extended or adjusted under 35 U.S.C. 154(b) by 0 days.

(21) Appl. No.: 16/295,685

(22) Filed: Mar. 7, 2019

(65) Prior Publication Data

US 2019/0202730 A1 Jul. 4, 2019

Related U.S. Application Data

(60) Continuation of application No. 14/504,755, filed on Oct. 2, 2014, now Pat. No. 10,227,253, which is a
(Continued)

(51) Int. Cl.
*C03C 3/097* (2006.01)
*C03C 3/095* (2006.01)
(Continued)

(52) U.S. Cl.
CPC ............ *C03C 3/097* (2013.01); *C03C 3/091* (2013.01); *C03C 3/095* (2013.01); *C03C 4/18* (2013.01);
(Continued)

(58) Field of Classification Search
CPC ......... C03C 3/097; C03C 3/091; C03C 3/095; C03C 4/18; C03C 21/002
See application file for complete search history.

(56) References Cited

U.S. PATENT DOCUMENTS 3,410,673 A * 11/1968 Marusak ............... C03C 21/002
65/30.14
3,433,611 A * 3/1969 Saunders ............. C03C 21/002
65/30.14
(Continued)

FOREIGN PATENT DOCUMENTS

GB 1346747 A 2/1974
JP 46007591 2/1971
(Continued)

OTHER PUBLICATIONS

Japanese Patent Application No. 2018036476; Machine Translation of the Office Action dated Nov. 27, 2019; Japan Patent Office; 3 Pgs.
(Continued)

*Primary Examiner* — Queenie S Dehghan
(74) *Attorney, Agent, or Firm* — Kevin M. Johnson

(57) ABSTRACT

A method of strengthening an alkali aluminoborosilicate glass. A compressive layer extending from a surface of the glass to a depth of layer is formed by exchanging larger metal cations for smaller metal cations present in the glass. In a second step, metal cations in the glass are exchanged for larger metal cations to a second depth in the glass that is less than the depth of layer and increase the compressive stress of the compressive layer. Formation of the compressive layer and replacement of cations with larger cations can be achieved by a two-step ion exchange process. An alkali aluminoborosilicate glass having a compressive layer and a crack indentation threshold of at least 3000 gf is also provided.

22 Claims, 4 Drawing Sheets

Related U.S. Application Data division of application No. 13/211,661, filed on Aug. 17, 2011, now abandoned.

(60) Provisional application No. 61/377,136, filed on Aug. 26, 2010.

(51) Int. Cl.
  *C03C 3/091* (2006.01)
  *C03C 4/18* (2006.01)
  *C03C 21/00* (2006.01)

(52) U.S. Cl.
  CPC ........ *C03C 21/002* (2013.01); *C03C 2204/00* (2013.01); *Y10T 428/2495* (2015.01); *Y10T 428/315* (2015.01)

(56) References Cited

U.S. PATENT DOCUMENTS

| | | | |
|---|---|---|---|
| 3,751,238 | A | 8/1973 | Grego et al. |
| 5,674,790 | A | 10/1997 | Araujo |
| 8,415,013 | B2 | 4/2013 | Barefoot et al. |
| 8,586,492 | B2 | 11/2013 | Barefoot et al. |
| 8,697,592 | B2 | 4/2014 | Ikenishi et al. |
| 8,778,820 | B2 | 7/2014 | Gomez et al. |
| 2001/0039810 | A1 | 11/2001 | Eda et al. |
| 2004/0163414 | A1 | 8/2004 | Eto et al. |
| 2006/0063009 | A1 | 3/2006 | Naitou et al. |
| 2009/0142568 | A1 | 6/2009 | Dejneka et al. |
| 2009/0202808 | A1 | 8/2009 | Glaesemann et al. |
| 2010/0028607 | A1 | 2/2010 | Lee et al. |
| 2010/0047521 | A1 | 2/2010 | Amin et al. |
| 2010/0291353 | A1* | 11/2010 | Dejneka ................ C03C 21/002 428/192 |
| 2011/0201490 | A1 | 8/2011 | Barefoot et al. |
| 2011/0294649 | A1 | 12/2011 | Gomez et al. |
| 2012/0321898 | A1 | 12/2012 | Meinhardt et al. |

FOREIGN PATENT DOCUMENTS

| | | |
|---|---|---|
| JP | 01239036 A | 9/1989 |
| JP | 1999328601 A | 11/1991 |
| JP | 10-194785 A | 7/1998 |
| JP | 2004-253074 A | 9/2004 |
| JP | 2008195602 A | 8/2008 |
| JP | 2010168252 A | 8/2010 |
| KR | 10-2010-0091228 A | 8/2010 |
| WO | 2011104035 A2 | 9/2011 |

OTHER PUBLICATIONS

Application No. 2013-526171, JP Office Action, dated Mar. 17, 2015.
CN201180041099.4 Office Action dated Jan. 9, 2015, 22 Pages.
English Translation of JP2018036476 Office Action dated Mar. 6, 2019; 5 Pages; Japanese Patent Office.
Patent Cooperation Treaty International Notification of Transmittal of the International Search Report and the Written Opinion of the International Searchign Authority; International Application No. PCT/US2011/049329; dated Nov. 29, 2011, 12 Pages.
Taiwan Patent Application No. 100130204, Search Report, dated August 6, 2015.
Application No. 11755480.8-1359, EP Exam Report, dated May 12, 2014.
Application No. 201180041099.4, CN First Office Action, dated Dec. 18, 2014.
Varshneya et al.; High-strength, large-case-depth chemically strengthened lithium aluminosilicate glass; American Ceramic Society Bulletin, vol. 88, No. 5; pp. 27-33.
European Patent Application No. 19155771.9 Office Action dated Jul. 1, 2019; 10 Pages; European Patent Office.
Korean Patent Application No. 10-2019-7018246, Office Action dated Nov. 16, 2020, 7 pages; (4 pages of English Translation and 3 pages of Original Document); Korean Patent Office.
Japanese Patent Application No. 2020-057326, Decision to Grant dated Apr. 7, 2021, 5 pages (2 pages of English Translation and 3 pages of Original Document); Japanese Patent Office.

* cited by examiner

TWO-STEP METHOD FOR STRENGTHENING GLASS

CROSS-REFERENCE TO RELATED APPLICATIONS

This application is a continuation of U.S. Utility application Ser. No. 14/504,755, filed on Oct. 2, 2014, which is a divisional application of U.S. Utility application Ser. No. 13/211,661, filed on Aug. 17, 2011, which claims the benefit of priority under 35 U.S.C. § 119 of U.S. Provisional Application Ser. No. 61/377,136 filed on Aug. 26, 2010, the content of each of which is relied upon and incorporated herein by reference in their entirety.

BACKGROUND

The disclosure relates to strengthened alkali aluminoborosilicate glasses. More particularly, the disclosure relates to a method of strengthening such glasses. Even more particularly, the disclosure relates to strengthening such glasses by ion exchange.

The ion exchange process can be used to strengthen alkali-containing glasses by creating compressive stress layers in the surface region of the glass. In general, lithium-containing aluminosilicate glasses are ion exchanged more readily than sodium-containing glasses and greater depths of compression can be obtained in lithium-containing aluminosilicate glasses at lower temperatures and shorter times. However, such lithium-containing aluminosilicate glasses tend to have lower strain and anneal points, and lower temperatures are required for treatment to avoid structural relaxation. In addition, the exchange of sodium for lithium in the glass, results in lower surface compression—which translates into lower surface strength—when compared to the surface compression achieved with the exchange of potassium for sodium in the glass.

SUMMARY

A method of strengthening an alkali aluminoborosilicate glass is provided. A compressive layer extending from a surface of the glass to a depth of layer is formed by exchanging larger metal cations for smaller metal cations present in the glass. In a second step, metal cations in the glass are exchanged for larger metal cations to a second depth that is less than the depth of layer. The second step increases the compressive stress of the compressive layer. For example, sodium cations are exchanged in the first step for lithium cations that are present in the glass to the depth of layer, and potassium cations are then exchanged in the second step for sodium cations and lithium cations in the glass to the second depth. The exchange of the potassium cations for sodium and lithium cations increases the compressive stress of the layer. Formation of the compressive layer and replacement of cations with larger cations can be achieved by a two-step ion exchange process. An alkali aluminoborosilicate glass having a compressive layer and a crack indentation threshold of at least 3000 gf is also provided.

Accordingly, one aspect of the disclosure is to provide a method of strengthening an alkali aluminoborosilicate glass. The method comprises the steps of: providing an alkali aluminoborosilicate glass comprising alkali metal cations; forming a compressive layer extending from a surface of the glass to a depth of layer, wherein the compressive layer is under a compressive stress; and replacing at least a portion of the alkali metal cations with a larger alkali metal cation to a second depth that is less than the depth of layer, and wherein replacing the alkali metal cations with the larger alkali metal cation increases the compressive stress.

A second aspect of the disclosure is to provide a method of strengthening an alkali aluminoborosilicate glass. The method comprises the steps of: providing the alkali aluminoborosilicate glass comprising lithium cations and sodium cations; replacing at least a portion of the lithium cations with sodium cations to form a compressive layer that extends from a surface of the glass to a depth of layer and is under compressive stress; and replacing at least a portion of the sodium cations and the lithium cations with potassium cations to a second depth that is less than the depth of layer, wherein the compressive layer is enriched in potassium cations to the second depth, and wherein replacing sodium cations and lithium cations with potassium cations increases the compressive stress of the compressive layer.

A third aspect of the disclosure is to provide an alkali aluminoborosilicate glass. The glass comprises lithium cations, sodium cations, and potassium cations. The glass has a surface having a compressive layer extending from the surface to a depth of layer and is enriched in potassium cations to a second depth that is less than the depth of layer. The surface of the glass has a crack initiation threshold of at least 3000 gf upon indentation with a Vickers indenter.

These and other aspects, advantages, and salient features will become apparent from the following detailed description, the accompanying drawings, and the appended claims.

DETAILED DESCRIPTION

Figure 1:
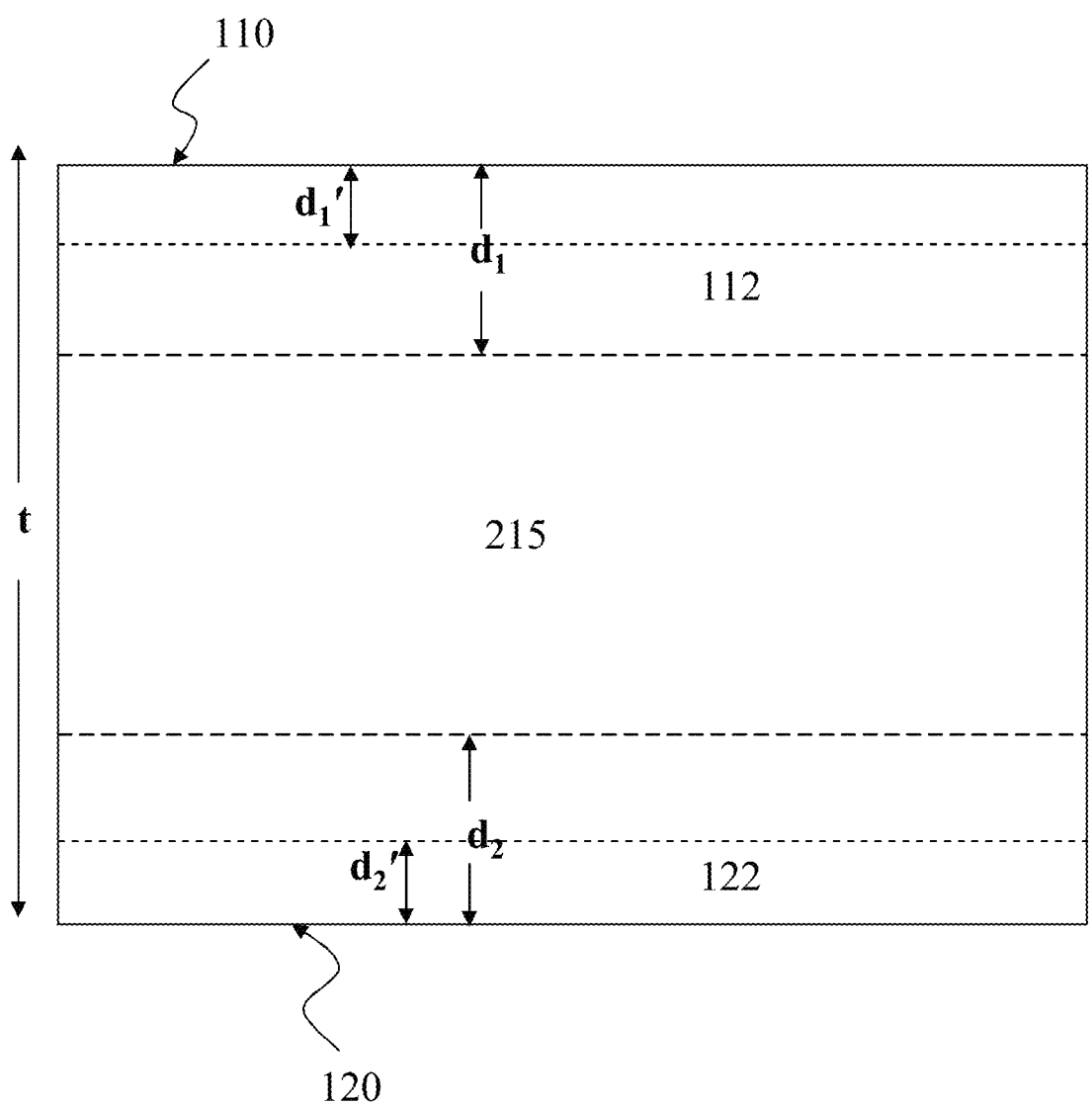
FIG. 1 is a schematic cross-sectional view of a glass sheet, described herein, having strengthened surfaces.

In the following description, like reference characters designate like or corresponding parts throughout the several views shown in the figures. It is also understood that, unless otherwise specified, terms such as "top," "bottom," "outward," "inward," and the like are words of convenience and are not to be construed as limiting terms. In addition, whenever a group is described as comprising at least one of a group of elements and combinations thereof, it is understood that the group may comprise, consist essentially of, or consist of any number of those elements recited, either individually or in combination with each other. Similarly, whenever a group is described as consisting of at least one of a group of elements or combinations thereof, it is understood that the group may consist of any number of those elements recited, either individually or in combination with each other. Unless otherwise specified, a range of values, when recited, includes both the upper and lower limits of the range. As used herein, the indefinite articles "a," "an," and the corresponding definite article "the" means "at least one" or "one or more," unless specified otherwise.

Referring to the drawings in general and to FIG. 1 in particular, it will be understood that the illustrations are for the purpose of describing particular embodiments and are not intended to limit the disclosure or appended claims thereto. The drawings are not necessarily to scale, and certain features and certain views of the drawings may be shown exaggerated in scale or in schematic in the interest of clarity and conciseness.

As used herein, the term "enriched," unless otherwise specified, means that the concentration of a specified element or ionic specie is greater than the average concentration of that element or ionic specie within the bulk of the glass. As used herein, the term "glass" refers to alkali aluminoborosilicate glasses, unless otherwise specified.

Methods of strengthening alkali aluminosilicate glass are provided. In one embodiment, the method comprises the steps of: providing the alkali aluminoborosilicate glass; initially forming a compressive layer extending from a surface of the glass to a depth of layer; and replacing at least a portion of alkali metal cations with a larger alkali metal cation to a second depth that is less than the depth of layer. Replacing the alkali metal cations with the larger alkali metal cation increases the compressive stress in the compressive layer and increases the damage resistance of the surface of the glass. The compressive layer inhibits the introduction of flaws at the surface and prevents crack initiation and propagation through the depth of the layer. In some embodiments, the method is carried out through the use of a two-step ion exchange process.

In the first step of the method, an alkali aluminoborosilicate glass is provided. In some embodiments, the glass is provided in the form of a sheet having a thickness of about 2 mm or less. Such sheets can be formed by down-draw methods known in the art such as slot-draw or fusion-draw processes, or by other methods known in the art. The glass, in some embodiments, comprises monovalent lithium cations, and sodium cations. The glass can additionally include monovalent potassium cations. The presence of such alkali metal cations in the glass is typically represented by the oxide species $Li_2O$, $Na_2O$, and $K_2O$. In some embodiments, the alkali aluminoborosilicate glass comprises, consists essentially of, or consists of: 50-70 mol % $SiO_2$; 5-15 mol % $Al_2O_3$; 5-20 mol % $B_2O_3$; 2-15 mol % $Li_2O$; 0-20 mol % $Na_2O$; and 0-10 mol % $K_2O$. In some embodiments, the glass can further comprise at least one of: 0-10 mol % $P_2O$; 0-5 mol % MgO; 0-1 mol % $CeO_2$; and 0-1 mol % $SnO_2$.

Non-limiting compositions and physical properties of representative glasses are listed in Table 1. Crack initiation thresholds, which were determined by indentation with a Vickers indenter, are also listed for the compositions in Table 1. Crack initiation thresholds, expressed in Kgf, were measured: 1) prior to ion exchange of the glass ("pre-IX" in Table 1); 2) following single-step ion exchange (IX) of the glass for 10 hours in a 390° C. molten salt bath containing 60% $KNO_3$ and 40% $NaNO_3$ by weight; 3) following single step ion exchange of the glass for 10 hours in a 390° C. molten $NaNO_3$ salt bath; and 4) following a two-step ion exchange process comprising ion exchange of the glass for 10 hours in a 390° C. molten $NaNO_3$ salt bath, followed by ion exchange for 30 minutes in a 390° C. molten $KNO_3$ salt bath. depths of layer (DOL) of the compressive layers formed by the ion exchange processes, expressed in microns (μm) are also listed in Table 1.

TABLE 1

Compositions and physical properties of representative alkali aluminoborosilicate glasses. Strain, anneal, and softening points are expressed in degrees Celsius; coefficients of thermal expansion (CTE) are expressed as $10^7 K^{-1}$; and densities are expressed in $g/cm^3$.

| (Mol %) | 1 | 2 | 3 | 4 | 5 | 6 | 7 |
|---|---|---|---|---|---|---|---|
| $SiO_2$ | 65.7 | 65.7 | 65.7 | 65.7 | 65.7 | 65.7 | 65.2 |
| $Al_2O_3$ | 12.3 | 12.3 | 12.3 | 12.3 | 10.3 | 10.3 | 11.1 |
| $B_2O_3$ | 9.1 | 9.1 | 9.1 | 7.1 | 11.1 | 9.1 | 6.2 |
| $Li_2O$ | 5 | 7 | 5 | 7 | 5 | 7 | 2.3 |
| $Na_2O$ | 6.6 | 4.6 | 4.6 | 6.6 | 6.6 | 6.6 | 9.8 |
| $K_2O$ | 1.3 | 1.3 | 3.3 | 1.3 | 1.3 | 1.3 | 2.7 |
| MgO | 0 | 0 | 0 | 0 | 0 | 0 | 2.2 |
| CaO | 0 | 0 | 0 | 0 | 0 | 0 | 0.32 |
| $P_2O_5$ | 0 | 0 | 0 | 0 | 0 | 0 | 0 |
| $SnO_2$ | 0 | 0 | 0 | 0 | 0 | 0 | 0.1 |
| $CeO_2$ | 0 | 0 | 0 | 0 | 0 | 0 | 0.05 |
| Strain pt. | 492 | 491 | 492 | 480 | 468 | 468 | 491 |
| Anneal pt. | 540 | 538 | 542 | 521 | 510 | 507 | 534 |
| Softening pt. | 785 | 786 | 799 | 731 | 709 | 691 | 743 |
| CTE | 66 | 62 | 67.2 | 69.9 | 65.3 | 68.9 | 79 |
| Density | 2.334 | 2.327 | 2.331 | 2.261 | 2.335 | 2.369 | 2.413 |
| Crack initiation threshold pre-IX, Kgf | 1000 | 1000 | 1000 | 1000 | 1000 | 500 | 1000 |
| DOL of IX 60$KNO_3$/40$NaNO_3$ @ 390° C., 10 h | 294 | 270 | 221 | 245 | 245 | 240 | 123 |
| Crack initiation threshold, Kgf | 5000 | 7000 | 4000 | 6000 | 4000 | 6000 | 4000 |
| DOL of IX $NaNO_3$ @ 390° C., 10 h | 294 | 270 | 196 | 245 | 245 | 265 | 108 |
| Crack initiation threshold, Kgf | 3000 | 3000 | 3000 | 3000 | 3000 | 3000 | 3000 |
| DOL of IX 1)$NaNO_3$ @ 390° C. 10 h 2) $KNO_3$ 390° C., 30 min | 294 | 270 | 196 | 245 | 245 | 265 | |
| Crack initiation threshold, Kgf | 5000 | 6000 | 6000 | 10000 | 5000 | 6000 | 6000 |

TABLE 1-continued

Compositions and physical properties of representative alkali aluminoborosilicate glasses. Strain, anneal, and softening points are expressed in degrees Celsius; coefficients of thermal expansion (CTE) are expressed as $10^7 K^{-1}$; and densities are expressed in $g/cm^3$.

| (Mol %) | 8 | 9 | 10 | 11 | 12 | 13 | 14 |
|---|---|---|---|---|---|---|---|
| $SiO_2$ | 65.2 | 65.2 | 65.2 | 65.2 | 65.2 | 65.2 | 65.2 |
| $Al_2O_3$ | 11.1 | 11.1 | 11.1 | 11.1 | 11.1 | 9.1 | 11.1 |
| $B_2O_3$ | 6.2 | 6.2 | 6.2 | 6.2 | 6.2 | 8.2 | 6.2 |
| $Li_2O$ | 4.3 | 6.3 | 8.3 | 12.1 | 8.3 | 2.3 | 5 |
| $Na_2O$ | 7.8 | 5.8 | 3.8 | 0 | 5.8 | 9.8 | 9.8 |
| $K_2O$ | 2.7 | 2.7 | 2.7 | 2.7 | 0.7 | 2.7 | 0 |
| MgO | 2.2 | 2.2 | 2.2 | 2.2 | 2.2 | 2.2 | 2.2 |
| CaO | 0.32 | 0.32 | 0.32 | 0.32 | 0.32 | 0.32 | 0.32 |
| $P_2O_5$ | 0 | 0 | 0 | 0 | 0 | 0 | 0 |
| $SnO_2$ | 0.1 | 0.1 | 0.1 | 0.1 | 0.1 | 0.1 | 0.1 |
| $CeO_2$ | 0.05 | 0.05 | 0.05 | 0.05 | 0.05 | 0.05 | 0.05 |
| Strain pt. | 480 | 479 | 476 | 483 | 479 | 481 | 487 |
| Anneal pt. | 522 | 520 | 517 | 523 | 519 | 522 | 529 |
| Softening pt. | 723 | 720 | 715 | 721 | 717 | 710 | 740 |
| CTE | 75 | 70 | 66 | 60 | 66 | 77.7 | 71.7 |
| Density | 2.407 | 2.398 | 2.39 | 2.372 | 2.396 | 2.415 | 2.405 |
| Crack initiation threshold pre-IX, Kgf | 500 | 1000 | 1000 | 500 | 1000 | 500 | 500 |
| DOL of IX 60$KNO_3$/40$NaNO_3$ @ 390° C., 10 h | 172 | 157 | 147 | 123 | 221 | 98 | 235 |
| Crack initiation threshold, Kgf | 5000 | 8000 | 8000 | >9000 | >10000 | 4000 | 7000 |
| DOL of IX $NaNO_3$ @ 390° C., 10 h | 157 | 186 | 74 | 137 | 167 | 132 | 147 |
| Crack initiation threshold, Kgf | 3000 | 3000 | 3000 | 3000 | 3000 | 3000 | 3000 |
| DOL of IX 1)$NaNO_3$ @ 390° C. 10 h 2) $KNO_3$ 390° C., 30 min | | | | | | | |
| Crack initiation threshold, Kgf | 9000 | 8000 | >9000 | >10000 | 10000 | 7000 | 9000 |

| (Mol %) | 15 | 16 | 17 | 18 | 19 | 20 | 21 |
|---|---|---|---|---|---|---|---|
| $SiO_2$ | 65.2 | 64.7 | 63.7 | 65.2 | 64.7 | 63.7 | 64.7 |
| $Al_2O_3$ | 12.3 | 12.3 | 12.3 | 12.3 | 12.3 | 12.3 | 11.1 |
| $B_2O_3$ | 9.1 | 9.1 | 9.1 | 9.1 | 9.1 | 9.1 | 6.3 |
| $Li_2O$ | 5 | 5 | 5 | 7 | 7 | 7 | 6.3 |
| $Na_2O$ | 6.6 | 6.6 | 6.6 | 4.6 | 4.6 | 4.6 | 5.8 |
| $K_2O$ | 1.3 | 1.3 | 1.3 | 1.3 | 1.3 | 1.3 | 2.7 |
| MgO | 0 | 0 | 0 | 0 | 0 | 0 | 2.2 |
| CaO | 0 | 0 | 0 | 0 | 0 | 0 | 0.32 |
| $P_2O_5$ | 0.5 | 1 | 2 | 0.5 | 1 | 2 | 0.5 |
| $SnO_2$ | 0.05 | 0.05 | 0.05 | 0.05 | 0.05 | 0.05 | 0.1 |
| $CeO_2$ | 0 | 0 | 0 | 0 | 0 | 0 | 0 |
| Strain pt. | 488.6 | 487 | 491 | 491 | 482 | 486 | 478 |
| Anneal pt. | 537.7 | 536 | 540 | 538 | 528 | 535 | 520 |
| Softening pt. | 795.3 | 788.7 | 789 | 806 | 774 | 774 | 729 |
| CTE | 65.9 | 65.1 | 66.2 | 61.5 | 63.1 | 63.4 | |
| Density | 2.332 | 2.332 | 2.327 | 2.327 | 2.325 | 2.321 | 2.392 |
| Crack initiation threshold pre-IX, Kgf | | | | | | | |
| DOL of IX 60$KNO_3$/40$NaNO_3$ @ 390° C., 10 h | 244 | 195 | 195 | 244 | 224 | 215 | 146 |
| Crack initiation threshold, Kgf | | | | | | | |
| DOL of IX $NaNO_3$ @ 390° C., 10 h | | | | | | | |
| Crack initiation threshold, Kgf | | | | | | | |
| DOL of IX 1)$NaNO_3$ @ 390° C. 10 h 2) $KNO_3$ 390° C., 30 min | | | | | | | |
| Crack initiation threshold, Kgf | | | | | | | |

TABLE 1-continued

Compositions and physical properties of representative alkali aluminoborosilicate glasses. Strain, anneal, and softening points are expressed in degrees Celsius; coefficients of thermal expansion (CTE) are expressed as $10^7 K^{-1}$; and densities are expressed in $g/cm^3$.

| (Mol %) | 22 | 23 |
|---|---|---|
| $SiO_2$ | 64.2 | 63.2 |
| $Al_2O_3$ | 11.1 | 11.1 |
| $B_2O_3$ | 6.2 | 6.2 |
| $Li_2O$ | 6.3 | 6.3 |
| $Na_2O$ | 5.8 | 5.8 |
| $K_2O$ | 2.7 | 2.7 |
| MgO | 2.2 | 2.2 |
| CaO | 0.32 | 0.32 |
| $P_2O_5$ | 1 | 2 |
| $SnO_2$ | 0.1 | 0.1 |
| $CeO_2$ | 0 | 0 |
| Strain pt. | 483 | 500 |
| Anneal pt. | 527 | 549 |
| Softening pt. | 748 | 796 |
| CTE | | |
| Density | 2.387 | 2.376 |
| Crack initiation threshold pre-IX, Kgf | | |
| DOL of IX 60$KNO_3$/40$NaNO_3$ @ 390° C., 10 h | 166 | 195 |
| Crack initiation threshold, Kgf | | |
| DOL of IX $NaNO_3$ @ 390° C., 10 h | | |
| Crack initiation threshold, Kgf | | |
| DOL of IX 1)$NaNO_3$ @ 390° C. 10 h 2) $KNO_3$ 390° C., 30 min | | |
| Crack initiation threshold, Kgf | | |

The alkali aluminoborosilicate glass as provided has intrinsically high damage resistance; i.e., the glass has high damage resistance prior to—or without—any chemical or thermal strengthening or tempering. Such damage resistance is measured or characterized by the resistance of the glass to crack formation and/or crack propagation upon indentation with a Vickers indenter. In some embodiments, the glass has a crack initiation threshold (i.e., the Vickers indenter load at which cracks are first observed) of at least about 1000 gf before strengthening and, in particular embodiments, in a range from about 1000 gf up to about 2000 gf, prior to strengthening. Examples of glass compositions that intrinsically have crack initiation thresholds in this range are listed in Table 2. In comparison, soda-lime glasses have low damage tolerance, and form cracks when indented at loads as low as 100 gf. Even when ion-exchanged, soda-lime glass typically has a damage tolerance of less than 1000 gf.

The formation of the compressive layer and increase damage resistance described herein can, in some embodiments, be achieved by a two-step ion exchange process. In this process, ions in the surface layer of the glass are replaced by—or exchanged with—larger ions having the same valence or oxidation state as the ions present in the glass. The exchange of metal cations is typically carried out in a molten salt bath, with larger cations from the bath typically replacing smaller cations within the glass. Ion exchange is limited to a region extending from the surface of the glass article to a depth (depth of layer, or "DOL") below the surface. By way of example, ion exchange of alkali metal-containing glasses can be achieved by immersing the glass in at least one molten salt bath containing a salt such as, but not limited to, nitrates, sulfates, and chlorides of at least one alkali metal ion. The temperature of such molten salt baths is typically in a range from about 380° C. up to

TABLE 2

Crack initiation thresholds for mixed alkali aluminoborosilicate glasses before strengthening.

| | Composition (mol %) | | | | | | | |
|---|---|---|---|---|---|---|---|---|
| | a | b | c | d | e | f | g | h |
| $SiO_2$ | 65.7 | 65.7 | 65.2. | 65.7 | 65.7 | 64.7 | 65.7 | 63.7 |
| $Al_2O_3$ | 12.3 | 12.3 | 11.1 | 11.3 | 10.8 | 11.3 | 10.3 | 11.3 |
| $B_2O_3$ | 9.1 | 0.1 | 6.2 | 11.1 | 11.6 | 12.1 | 12.1 | 13.1 |
| $Li_2O$ | 5 | 7 | 8.3 | 4.6 | 4.6 | 4.6 | 4.6 | 4.6 |
| $Na_2O$ | 6.6 | 4.6 | 3.8 | 6.2 | 6.2 | 6.2 | 6.2 | 6.2 |
| $K_2O$ | 1.3 | 1.3 | 2.7 | 1.1 | 1.1 | 1.1 | 1.1 | 1.1 |
| MgO | 0 | 0 | 2.2 | 0 | 0 | 0 | 0 | 0 |
| CaO | 0 | 0 | 0.32 | 0 | 0 | 0 | 0 | 0 |
| $SnO_2$ | 0 | 0 | 0.1 | 0 | 0 | 0 | 0 | 0 |
| Crack Initiation Load (gf) | 1000 | 1000 | 1000 | 2000 | 1000 | 1000 | 1000 | 1000 | about 450° C., with immersion times ranging up to about 16 hours. However, temperatures and immersion times that are different from those described herein can also be used. The replacement or exchange of smaller cations within the glass with larger cations from the bath creates a compressive stress in the region near the surface of the glass to the depth of layer. The compressive stress near the surface gives rise to a central tension in an inner or central region of the glass so as to balance forces within the glass.

The step of initially forming the compressive layer provides a compressive layer having an unusually deep depth of layer. In some embodiments, the step of forming the compressive layer comprises replacing smaller alkali metal cations with larger alkali metal cations. In a particular embodiment, this step comprises replacing lithium cations in the glass with sodium cations from, for example, a molten salt bath, by ion exchange to the depth of layer below the surface of the glass. The exchange of $Na^+$ ions for $Li^+$ ions achieves an advantageously deep depth of layer (e.g., $d_1$, $d_2$, in FIG. 1). In such embodiments, the depth of layer is at least 50 μm, and can, in some embodiments, extend from the surface to a depth in a range from about 70 μm up to about 290 μm.

The exchange of $Na^+$ ions for $Li^+$ ions can be achieved by immersing the glass in a first ion exchange bath comprising at least one molten sodium salt. In some embodiments, the sodium salt is sodium nitrate ($NaNO_3$). In some embodiments, the ion exchange bath contains only sodium salt; i.e., no other metal salts are intentionally added to the bath. In other embodiments, however, the first ion exchange bath further includes salts of other alkali metals such as, but not limited to, potassium nitrate ($KNO_3$). In one non-limiting example, the first ion exchange bath comprises 40% $NaNO_3$ and 60% $KNO_3$ by weight. In another non-limiting example, the first ion exchange bath comprises 20% $NaNO_3$ and 80% $KNO_3$ by weight.

Following formation of the compressive layer, at least a portion of the small alkali metal cations (e.g., $Li^+$, $Na^+$) in the compressive layer are replaced by a single, larger alkali metal cation specie to a second depth (e.g., $d_1'$, $d_2'$, in FIG. 1) that is less than the depth of layer. In some embodiments, this is achieved by exchanging potassium ions for at least one of sodium ions and lithium ions in the glass. The exchange of K+ ions for $Na^-$ ions and $Li^+$ to the second depth increases the surface compressive stress of the glass. In some embodiments, the second depth extends from the surface to a depth in a range from about 5 μm up to about 20 μm. Such ion exchange is achieved by immersing the glass in a second ion exchange bath comprising a potassium sodium salt. In some embodiments, the potassium salt is potassium nitrate ($KNO_3$).

After the glass has been strengthened by forming the deep compressive layer and replacing smaller ions with larger ions to a lesser depth using the two-step ion exchange process described hereinabove, the glass has a crack initiation threshold of at least 3000 gf when indented with a Vickers indenter, a compressive stress of at least 500 MPa, and a depth of layer of at least 50 μm.

An alkali aluminoborosilicate glass comprising lithium cations, sodium cations, and potassium cations is also provided. The glass has a compressive stress layer extending from a surface of the glass to a depth of layer. The compressive layer of the glass is enriched in potassium cations to a second depth that is less than the depth of layer. The surface also has a crack initiation threshold of at least 3000 gf when indented with a Vickers indenter.

A cross-sectional view of an alkali aluminoborosilicate glass sheet strengthened by the methods described herein is schematically shown in FIG. 1. In the non-limiting example shown in FIG. 1, strengthened glass sheet 100 has a thickness t, a first surface 110 and second surface 120 that are substantially parallel to each other, central portion 115. Compressive layers 112, 122 extend from first surface 110 and second surface 120, respectively, to depths of layer $d_1$, $d_2$, below each surface. Compressive layers 112, 122 are under a compressive stress, while central portion 115 is under a tensile stress, or in tension. The tensile stress in central portion 115 balances the compressive stresses in compressive layers 112, 122, thus maintaining equilibrium within strengthened glass sheet 100. Each of compressive layers 112, 122 of the glass is enriched in potassium cations to second depths $d_3'$, $d_2'$, respectively, wherein second depths $d_1'$, $d_2'$ are less than depths of layer $d_1$, $d_2$. Whereas a glass sheet having compressive layers 112, 122 extending from opposite surfaces 120, 120 is shown in FIG. 1, the glass described herein can have a strengthened single surface, rather than multiple strengthened surfaces. This can be achieved, for example, by masking one of surfaces 110, 120 during the two-step ion exchange process, which is described herein and is used to strengthen glass sheet 100.

In some embodiments, the first depth of layer extends from the surface of the glass to a depth in a range from about 70 μm up to about 290 μm. In some embodiments, the second depths $d_1'$, $d_2'$ extend from surfaces 112, 122 to a depth in a range from about 5 μm up to about 20 μm.

The compressive layer is, in some embodiments, formed by the methods described hereinabove, such as, for example, the two-step ion exchange process described above. As previously described herein, the method comprises the steps of: providing the alkali aluminoborosilicate glass; forming a compressive layer extending from a surface of the glass to a depth of layer ($d_1$, $d_2$ in FIG. 1); wherein the compressive layer is under a compressive stress; and replacing alkali metal cations in the compressive layer with a larger alkali metal cation to a second depth ($d_1'$, $d_2'$ in FIG. 1) that is less the depth of layer. The replacement of the alkali metal cations with a larger alkali metal cationic specie increases the compressive stress in the compressive layer.

In some embodiments, the glass is in the form of a sheet having a thickness of about 2 mm or less. Such sheets can be formed by down-draw methods known in the art such as slot-draw or fusion-draw processes, or by other methods known in the art. In some embodiments, the alkali aluminoborosilicate glass comprises, consists essentially of, or consists of: 50-70 mol % $SiO_2$; 5-15 mol % $Al_2O_3$; 5-20 mol % $B_2O_3$; 2-15 mol % $Li_2O$; 0-20 mol % $Na_2O$; and 0-10 mol % $K_2O$. In some embodiments, the glass can further comprise at least one of: 0-10 mol % $P_2O$; 0-5 mol % MgO; 0-1 mol % $CeO_2$; and 0-1 mol % $SnO_2$. Compositions and physical properties, and damage resistance of representative glasses are listed in Table 1.

The glasses described herein intrinsically (i.e., prior to thermal or chemical strengthening (e.g., ion exchange)) possess high levels of damage resistance. Such damage resistance is measured or characterized by the resistance of the glass to crack formation and/or crack propagation upon indentation with a Vickers indenter. In some embodiments, the glass has a crack initiation threshold (i.e., the Vickers indenter load at which cracks are first observed) of at least about 1000 gf before strengthening and, in particular embodiments, in a range from about 1000 gf up to about 2000 gf, prior to strengthening. Examples of glass compositions that intrinsically have crack initiation thresholds in this range are listed in Table 2. In comparison, soda-lime glasses have low damage tolerance, and form cracks when indented at loads as low as 100 gf. Even when ion-exchanged, soda-lime glass typically has a damage tolerance of less than 1000 gf.

The tolerance to damage and strength of the alkali aluminoborosilicate glasses having intrinsic damage resistance can be greatly enhanced by the use of a 2 step ion-exchange process. The two-step strengthening/ion exchange processes described hereinabove provide new opportunities for the use of such glasses in those consumer electronics applications where high strength and scratch resistance are desirable. Such applications include, but are not limited to, cover plates, display windows, display screens, touch screens, and the like for portable or hand-held electronic communication and entertainment devices.

EXAMPLES

The following examples illustrate the features and advantages of the methods and glasses described herein and are in no way intended to limit the disclosure or appended claims thereto.

Example 1

Crack initiation thresholds were measured with a Vickers indenter for representative alkali aluminoborosilicate glass compositions before ion exchange and following ion exchange under different conditions.

Glass samples having selected compositions were subjected to single-step ion exchange by immersion in a single molten salt bath. Different glass samples having these same compositions were subjected to two-step ion exchange in multiple salt baths, in accordance with the methods described hereinabove.

The single-step ion exchange baths used were: a) a 390° C. molten $NaNO_3$ salt bath; and b) a 390° C. molten salt bath containing 60% $KNO_3$ and 40% $NaNO_3$ by weight. The glass samples that were ion exchanged in the pure $NaNO_3$ bath were immersed in the bath for 5 hours. Glass samples that were ion exchanged in the $KNO_3/NaNO_3$ bath were immersed in the bath for 10 hours.

Two sets of two-step, multiple ion exchange baths were used. The first set of multiple baths consisted of a first bath of molten $NaNO_3$ salt at 390° C., followed by a second bath of molten $KNO_3$ salt at 390° C. Glass samples were immersed in the first ($NaNO_3$) bath for 10 hours, and then immersed in the second ($KNO_3$) bath for 30 minutes. The second set of multiple baths consisted of a first bath of molten $NaNO_3$ salt at 410° C., followed by a second bath of molten $KNO_3$ salt at 410° C. Glass samples were immersed in the first ($NaNO_3$) bath for 10 hours, and then immersed in the second ($KNO_3$) bath for 10 minutes.

For comparison, crack initiation thresholds for soda lime glass were measured before ion exchange and after ion exchange in a 410° C. $KNO_3$ bath for 8 hours.

Figure 2:
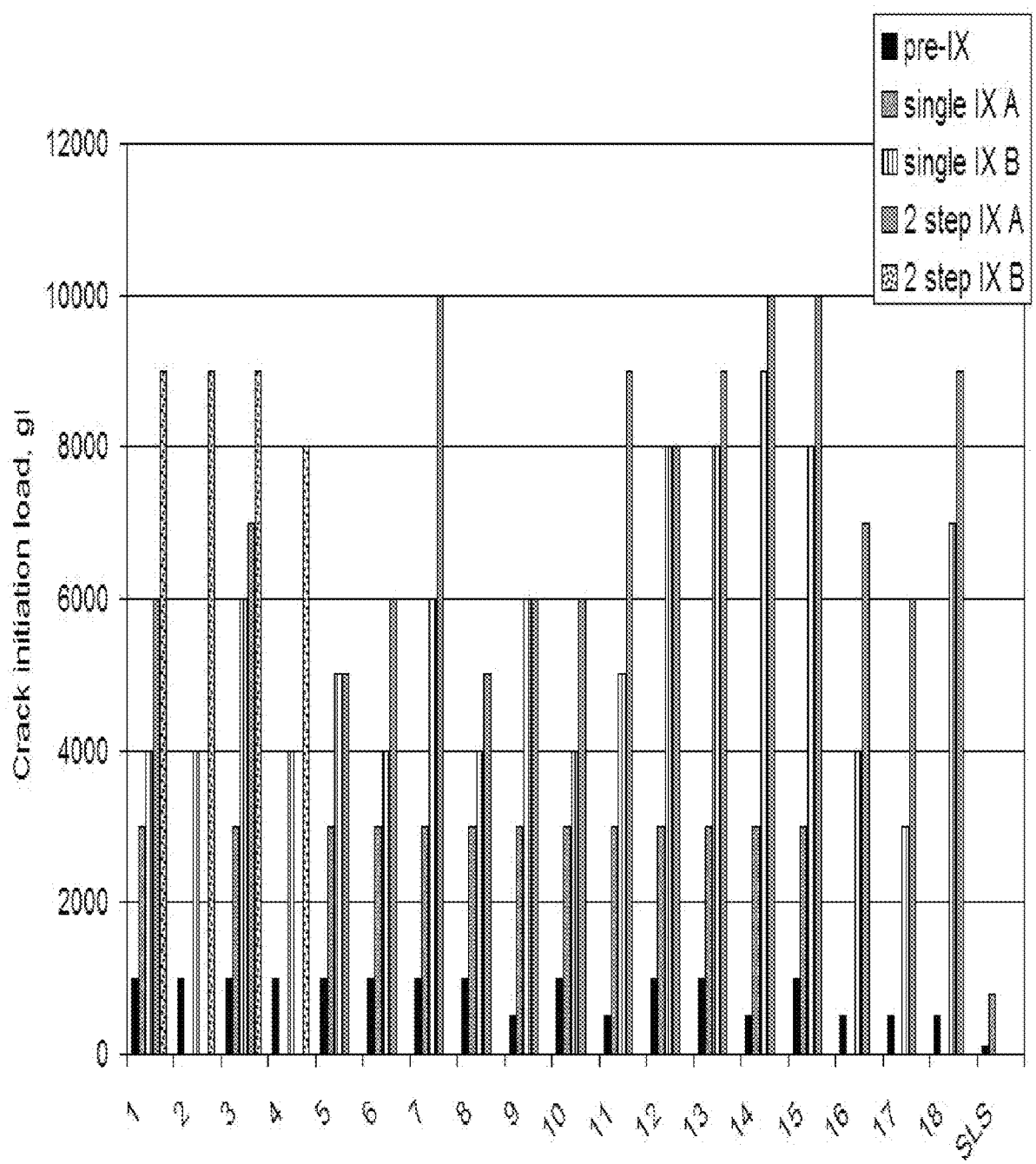
FIG. 2 is a plot of crack initiation loads obtained for alkali aluminoborosilicate glasses measured before strengthening and following strengthening by ion exchange processes.

Crack initiation thresholds were measured for different compositions before and after ion exchange and are plotted in FIG. 2. For comparison, crack initiation thresholds for soda lime glass (SLS in FIG. 2) were measured before ion exchange and following ion exchange in a 410° C. $KNO_3$ bath for 8 hours. Single-step ion exchange of the glasses provided approximately a three-fold improvement in damage resistance. The two-step ion exchange processes, as described hereinabove, allowed the use of loads as high as 10,000 gf before crack formation is observed.

Example 2

The effect of the second ion exchange step is illustrated by the data shown in Table 3, which lists depths of layer (DOL) and compressive stresses (CS) measured for 1 mm alkali aluminoborosilicate glass samples following different ion exchange (IX) procedures. The compositions of the samples listed in Table 3 are: i) 65.7 mol % $SiO_2$; 12.3 mol % $Al_2O_3$; 9.1 mol % $B_2O_3$; 5 mol % $Li_2O$; 6.6 mol % $Na_2O$; 1.3 mol % $K_2O$; 0.1 mol % $SnO_2$; and 0.15 $CeO_2$; ii) 65.7 mol % $SiO_2$; 10.3 mol % $Al_2O_3$; 12.1 mol % $B_2O_3$; 4.6 mol % $Li_2O$; 6.2 mol % $Na_2O$; 1.1 mol % $K_2O$; 0.1 mol % $SnO_2$; and 0.15 $CeO_2$; and iii) 57.9 mol % $SiO_2$; 12.1 mol % $Al_2O_3$; 18.1 mol % $B_2O_3$; 4.6 mol % $Li_2O$; 6.2 mol % $Na_2O$; 1.1 mol % $K_2O$; 0.1 mol % $SnO_2$; and 0.15 $CeO_2$.

One set of samples of each composition was ion exchanged in a single-step process by immersion in a 390° C. molten salt bath containing 80 wt % $KNO_3$ and 20 wt % $NaNO_3$ for 5 hours. Two-step ion exchange consisted of immersion a 390° C. molten salt bath containing 80 wt % $KNO_3$ and 20 wt % $NaNO_3$ for 5 hours followed by immersion in a 410° C. $KNO_3$ molten salt bath for 1 hour. Immersion in the second ion exchange bath in accordance with the methods described hereinabove increased the compressive stress of all samples.

A second set of samples of each composition was ion exchanged in a single-step process by immersion in a 390° C. molten salt bath containing 60 wt % $KNO_3$ and 40 wt % $NaNO_3$ for 5 hours. Two-step ion exchange consisted of immersion a 390° C. molten salt bath containing 60 wt % $KNO_3$ and 40 wt % $NaNO_3$ for 5 hours followed by immersion in a 410° C. $KNO_3$ molten salt bath for 1 hour. Immersion in the second ion exchange bath in accordance with the methods described hereinabove increased the compressive stress of all samples.

TABLE 3

Depth of layer (DOL) and compressive stress (CS) of alkali aluminoborosilicate using different ion exchange (IX) conditions.

| | Sample (i) | | Sample (ii) | | Sample (iii) | |
|---|---|---|---|---|---|---|
| IX procedure | DOL (μm) | CS (MPa) | DOL (μm) | CS (MPa) | DOL (μm) | CS (MPa) |
| Single-step 80 wt % $KNO_3$/20 wt % $NaNO_3$; 5 hrs at 390° C. | 195 | 577 | 195 | 540 | 107 | 562 |
| Two-step 1) 80 wt % $KNO_3$/20 wt % $NaNO_3$; 5 hrs at 390° C.; 2) $KNO_3$; 1 hr at 410° C. | | 791 | | 711 | | 726 |
| Single-step 60 wt % $KNO_3$/40 wt % $NaNO_3$; 5 hrs at 390° C. | 195 | 516 | 146 | 494 | 88 | 490 |
| Two-step 1) 60 wt % $KNO_3$/40 wt % $NaNO_3$; 5 hrs at 390° C.; 2) $KNO_3$; 1 hr at 410° C. | | 800 | | 761 | | 707 |

The strengths of alkali aluminoborosilicate glass samples before ion exchange and after single-step and two-step ion exchange processes were also measured using ring-on-ring measurements performed on polished surfaces of 1 mm thick glass samples. All samples comprised 65.7 mol % $SiO_2$; 10.3 mol % $Al_2O_3$; 12.1 mol % $B_2O_3$; 4.6 mol % $Li_2O$; 6.2 mol % $Na_2O$; and 1.1 mol % $K_2O$. The measured ring-on-ring strength of the sample before ion exchange was 131±45 MPa. Single-step ion exchange in a 390° C. molten salt bath containing 60 wt % $KNO_3$ and 40 wt % $NaNO_3$ for 6 hours yielded a ring-on-ring strength of 491±108 MPa. Two-step ion exchange consisted of immersion in a 390° C. molten salt bath containing 60 wt % $KNO_3$ and 40 wt % $NaNO_3$ for 6 hours followed by immersion in a 410° C. $KNO_3$ molten salt bath for 1 hour yielded a ring-on-ring strength of 647±215 MPa. The two-step ion exchange process, in accordance with the methods described hereinabove, thus resulted in an increase in ring-on-ring strength of about 30% over the single-step process.

Example 3

Figure 3A:
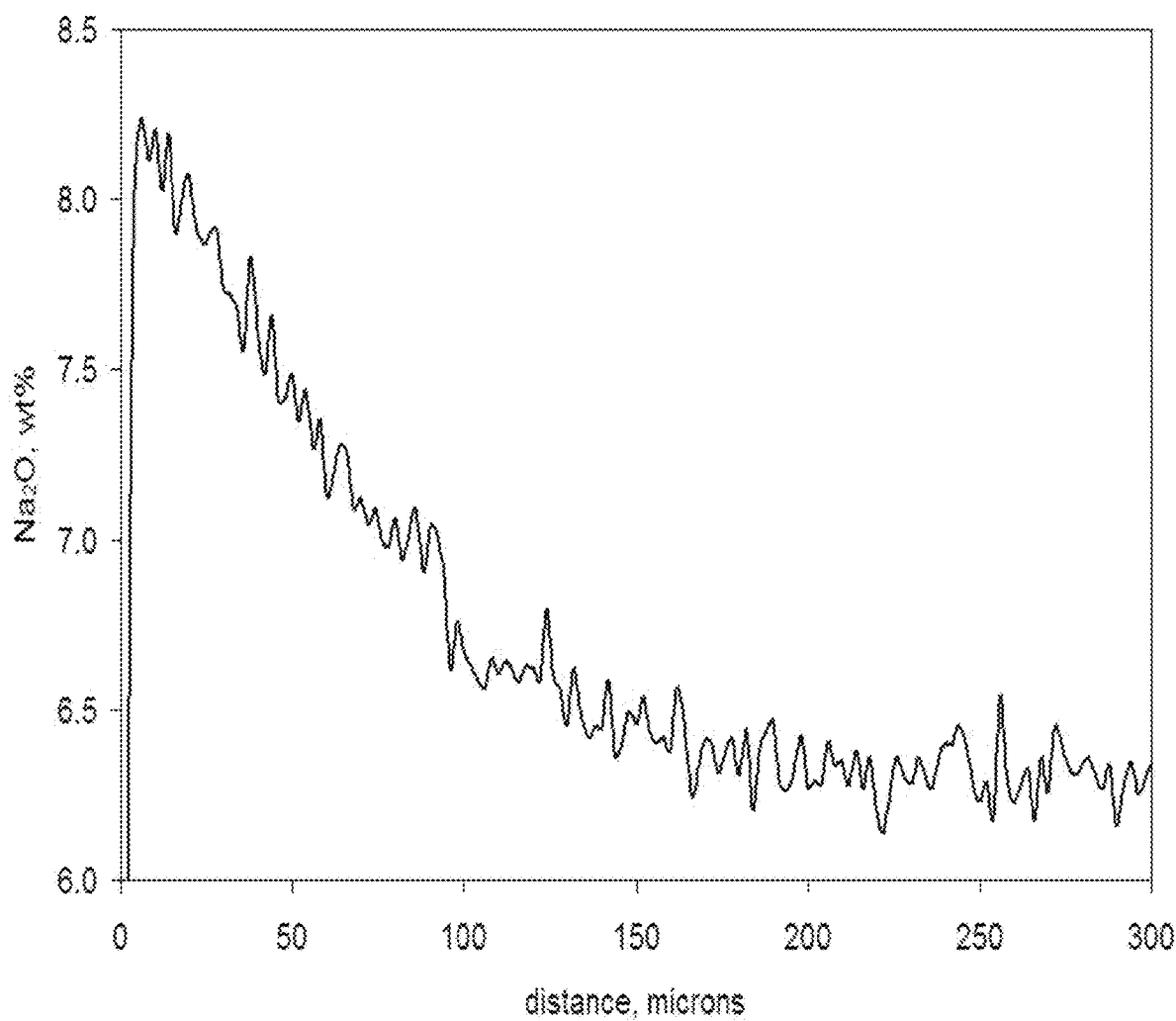
FIG. 3a is plot of $Na_2O$ concentration profile following the first step of a two-step ion exchange process.
Figure 3B:
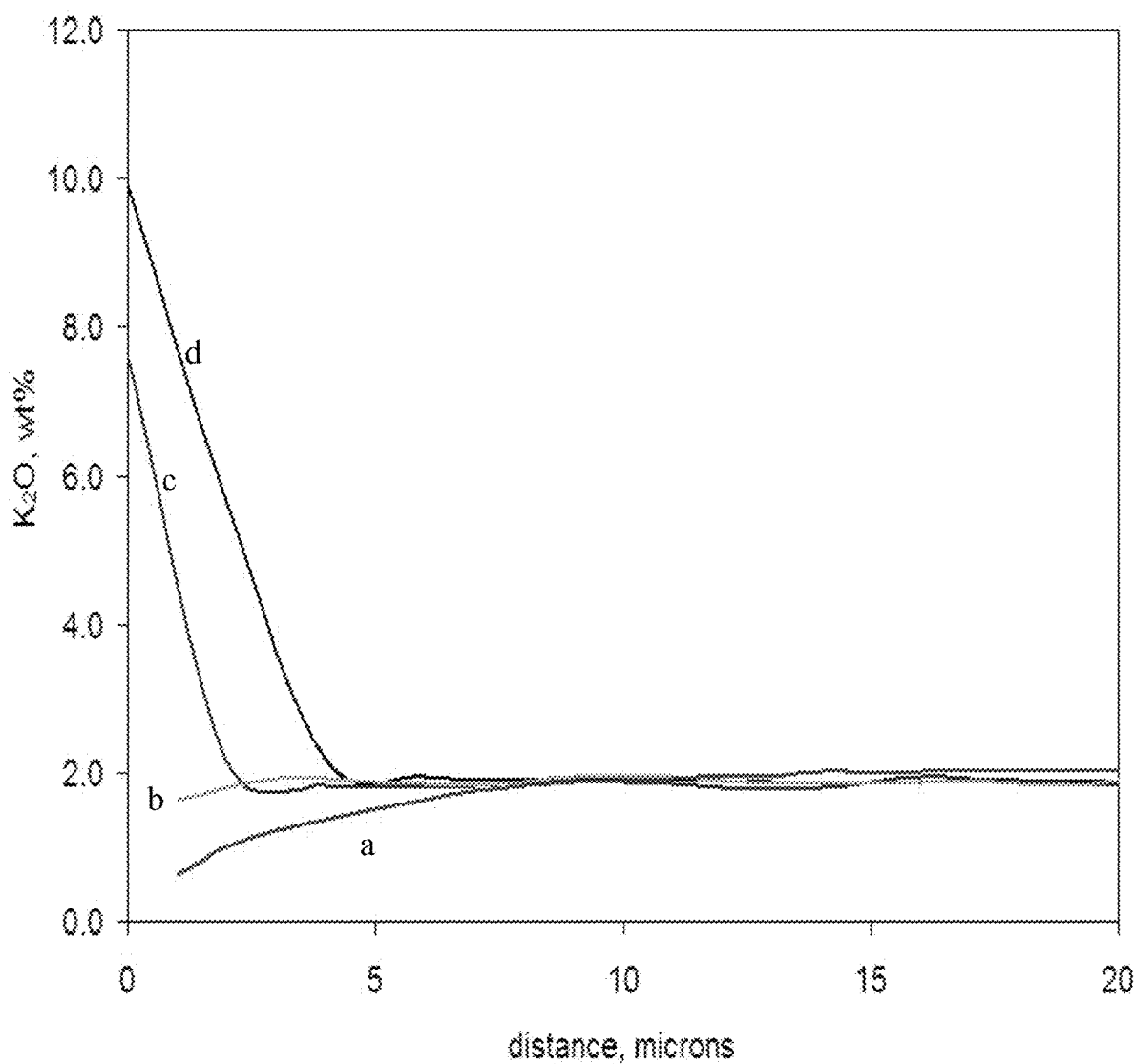
FIG. 3b is plot of $K_2O$ concentration profile following the second step of a two-step ion exchange process.

Electron microprobe analysis was used to investigate $Na_2O$ and $K_2O$ concentrations in alkali aluminoborosilicate samples following a two-step ion exchange process carried out in accordance with the methods described hereinabove. FIG. 3a is a plot of the $Na_2O$ concentration profile determined by electron microprobe analysis following the first ion exchange step (immersion in a 390° C. molten $NaNO_3$ salt bath for 5 hours). FIG. 3b is a plot of the $K_2O$ concentration profile determined by electron microprobe analysis following the second ion exchange step (immersion in a 410° C. molten $KNO_3$ salt bath for: a) 0 minutes (i.e., corresponding to single-step ion exchange); b) 10 minutes; c) 20 minutes; and d) 60 minutes. The concentrations of $Na^+$ and $K^+$ ions correspond to the $Na_2O$ and $K_2O$ concentrations, respectively, shown in FIGS. 3a and 3b. The $K^+$ and $Na^+$ concentrations on the glass surface relate to compressive stress, while the distance these ions diffuse into the glass relates to the depth of layer of the compressive layer. As previously described hereinabove, the first step of the two-step process (FIG. 3a) develops the deep depth of layer, while the second step (FIG. 3b) adds a shallow layer that provides the glass with a high compressive stress. The time for which the second step is allowed to proceed dictates the $K^+$ surface concentration and thus the compressive stress level that is ultimately achieved. For example, a surface compressive stress of 895 MPa was observed for sample d (FIG. 3b), which was ion exchanged in the second $KNO_3$ bath for 60 minutes While typical embodiments have been set forth for the purpose of illustration, the foregoing description should not be deemed to be a limitation on the scope of the disclosure or appended claims. Accordingly, various modifications, adaptations, and alternatives may occur to one skilled in the art without departing from the spirit and scope of the present disclosure or appended claims.

The invention claimed is:

1. A method, the method comprising:
 a. contacting an alkali aluminoborosilicate glass with a first ion exchange bath to form a compressive layer extending from a surface of the glass to a depth of layer, wherein the compressive layer is under a compressive stress, wherein the alkali aluminoborosilicate glass prior to the contacting with the first ion exchange bath comprises: 5-20 mol % $B_2O_3$; and 2-8.3 mol % $Li_2O$; and
 b. contacting the alkali aluminoborosilicate glass with a second ion exchange bath to replace at least a portion of the alkali metal cations in the compressive layer with a larger alkali metal cation to a second depth that is less than the depth of layer, wherein replacing the alkali metal cations in the compressive layer with the larger alkali metal cation increases the compressive stress, wherein the alkali aluminoborosilicate glass after the contacting with the second ion exchange bath has a crack initiation threshold of at least 6000 gf upon indentation with a Vickers indenter and wherein the surface has a compressive stress of at least 711 MPa, wherein the glass is a glass sheet having a thickness of up to 2 mm.

2. The method of claim 1, wherein contacting the alkali aluminoborosilicate glass with a first ion exchange bath comprises replacing lithium cations with sodium cations to the depth of layer of the glass.

3. The method of claim 2, wherein the first ion exchange bath comprises a sodium salt.

4. The method of claim 3, wherein the first ion exchange bath further comprises a potassium salt.

5. The method of claim 1, wherein contacting the alkali aluminoborosilicate glass with a second ion exchange bath comprises replacing at least one of sodium cations and lithium cations with potassium cations within the second depth.

6. The method of claim 5, wherein the second ion exchange bath comprises a potassium salt.

7. The method of claim 1, wherein the alkali aluminoborosilicate glass prior to the contacting with the first ion exchange bath comprises: 50-70 mol % $SiO_2$; 5-15 mol % $Al_2O_3$; 0-20 mol % $Na_2O$; and 0-10 mol % $K_2O$.

8. The method of claim 7, wherein the alkali aluminoborosilicate glass further comprises at least one of: 0-10 mol % $P_2O_5$; 0-5 mol % MgO; 0-1 mol % $CeO_2$; and 0-1 mol % $SnO_2$.

9. The method of claim 1, wherein the alkali aluminoborosilicate glass after the contacting with the second ion exchange bath has a depth of layer of at least 50 μm.

10. The method of claim 9, wherein the depth of layer is in a range from 70 μm up to 290 μm.

11. The method of claim 1, wherein the second depth is in a range from 5 μm up to 20 μm.

12. The method of claim 1, wherein the alkali aluminoborosilicate glass prior to the contacting with the first ion exchange bath has a crack initiation threshold of at least 1000 gf upon indentation with a Vickers indenter.

13. A method, the method comprising:
 a. contacting an alkali aluminoborosilicate glass with a first ion exchange bath to form a compressive layer extending from a surface of the glass to a depth of layer, wherein the compressive layer is under a compressive stress, wherein the alkali aluminoborosilicate glass prior to the contacting with the first ion exchange bath comprises: 5-20 mol % $B_2O_3$; and 2-8.3 mol % $Li_2O$; and
 b. contacting the alkali aluminoborosilicate glass with a second ion exchange bath to replace sodium cations and lithium cations in the compressive layer with potassium cations to a second depth that is less than the depth of layer, and wherein replacing the lithium cations and the sodium cations in the compressive layer with the potassium cations increases the compressive stress, wherein the alkali aluminoborosilicate glass after the contacting with the second ion exchange bath has a crack initiation threshold of at least 6000 gf upon indentation with a Vickers indenter and wherein the surface has a compressive stress of at least 711 MPa, wherein the glass is a glass sheet having a thickness of up to 2 mm.

14. The method of claim 13, wherein the first ion exchange bath comprises a sodium salt.

15. The method of claim 14, wherein the first ion exchange bath further comprises a potassium salt.

16. The method of claim 13, wherein the second ion exchange bath comprises a potassium salt.

17. The method of claim 13, wherein the alkali aluminoborosilicate glass prior to the contacting with the first ion exchange bath comprises: 50-70 mol % $SiO_2$; 5-15 mol % $Al_2O_3$; 0-20 mol % $Na_2O$; and 0-10 mol % $K_2O$.

18. The method of claim 17, wherein the alkali aluminoborosilicate glass further comprises at least one of: 0-10 mol % $P_2O_5$; 0-5 mol % MgO; 0-1 mol % $CeO_2$; and 0-1 mol % $SnO_2$.

19. The method of claim 12, wherein the alkali aluminoborosilicate glass after the contacting with the second ion exchange bath has a depth of layer of at least 50 μm.

20. The method of claim 19, wherein the depth of layer is in a range from 70 μm up to 290 μm.

21. The method of claim 13, wherein the second depth is in a range from 5 μm up to 20 μm.

22. The method of claim 13, wherein the alkali aluminoborosilicate glass prior to the contacting with the first ion exchange bath has a crack initiation threshold of at least 1000 gf upon indentation with a Vickers indenter.

* * * * *

UNITED STATES PATENT AND TRADEMARK OFFICE
CERTIFICATE OF CORRECTION

PATENT NO. : 11,078,106 B2  Page 1 of 1
APPLICATION NO. : 16/295685
DATED : August 3, 2021
INVENTOR(S) : Sinue Gomez et al.

It is certified that error appears in the above-identified patent and that said Letters Patent is hereby corrected as shown below:

On the Title Page

On page 2, in Column 2, item (56), Other Publications, Line 8, delete "Searchign" and insert -- Searching --, therefor.

In the Claims

In Column 15, Line 18, Claim 19, delete "12," and insert -- 13, --, therefor.

Signed and Sealed this
Sixteenth Day of November, 2021

Drew Hirshfeld
*Performing the Functions and Duties of the*
*Under Secretary of Commerce for Intellectual Property and*
*Director of the United States Patent and Trademark Office*